Patented May 10, 1927.

1,627,738

UNITED STATES PATENT OFFICE.

ALFRED HOLL, OF OFFENBACH-ON-THE-MAIN, GERMANY, ASSIGNOR TO GRASSELLI DYESTUFF CORPORATION, OF NEW YORK, N. Y., A CORPORATION OF DELAWARE.

VAT DYESTUFFS OF THE ANTHRAQUINONE SERIES.

No Drawing. Application filed December 8, 1925, Serial No. 74,172, and in Germany December 22, 1924.

My invention relates to new vat dyestuffs of the anthraquinone series which are fast to alkali, and which are obtainable by the action of formaldehyde upon pyrazolanthron yellow bodies to which the literature assigns the general formula:

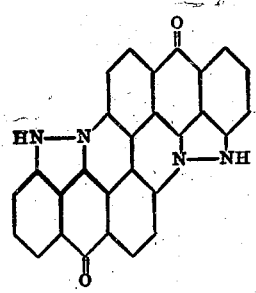

in which the anthraquinone nuclei may be substituted. The dyestuffs in their dry pulverized form are green to orange-yellow powders, soluble in concentrated sulfuric acid giving red colored solutions and in boiling hot nitrobenzol giving orange-yellow colored solutions. From a blue hydrosulfite vat, they dye cotton reddish to greenish tints which are fast to alkali.

The new dyestuffs may be obtained by treating the pyrazolanthron yellow bodies with formaldehyde in a sulfuric acid solution. The chemical constitution of the dyestuffs is not known.

Besides the pyrazolanthron yellow itself, there may be used its derivatives, for example, the chlorine substitution products.

The following examples illustrate the invention:

(1) 1 part of paraformaldehyde and 5 parts of pyrazolanthron yellow are dissolved in 50 parts of 66° Bé. sulfuric acid. The solution is stirred for about a week at room temperature and then poured into water, and the resulting dyestuff is separated, washed and dried. The product is a greenish yellow powder which dissolves in concentrated sulfuric acid giving a red colored solution and in boiling hot nitrobenzol, one part of the dyestuff to one hundred and fifty parts of the nitrobenzol, giving an orange-yellow colored solution without fluorescence. The dyestuff is crystallizable from the nitrobenzol solution. A lukewarm blue vat of the dyestuff dyes cotton a blue tint which upon exposure to the air changes to a bright greenish yellow color, the resulting dyeings being fast to light and alkali.

(2) 1 part of formaldehyde and 5 parts of pyrazolanthron yellow are dissolved in 50 parts of oleum and the solution stirred for several hours at 50° C. By pouring the resulting solution into water and separating the dyestuff in the usual way, one obtains a dyestuff which in its dry form is an orange-colored powder soluble in sulfuric acid with a red color and in boiling hot nitrobenzol (1:150) with an orange-yellow color. The nitrobenzol solution is without fluoresence. The dyestuff may be crystallized from the nitrobenzol solution. A blue warm vat of the dyestuff dyes cotton blue tints which upon exposure to the air change to a bright reddish yellow fast to alkali.

(3) If a sulfuric acid solution, such as is described in Example 1, is kept warm for several hours at approximately 50°, there is obtained a dyestuff possessing characteristics similar to those described in Example 2, but which dyes cotton blue tints which on exposure to the air change into a bright gold-yellow fast to alkali. On subjecting the dyestuff to several recrystallizations, it can be separated into the dyestuff of Example 1 which dyes a greenish yellow, and the dyestuff of Example 2 which dyes a reddish yellow.

I claim
1. As new products, vat dyestuffs of the anthraquinone series fast to alkali, which are reaction products of formaldehyde upon pyrazolanthron yellow compounds, to which the literature assigns the general formula:

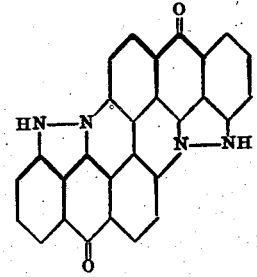

in which the anthraquinone nucleus may be further substituted, which dyestuffs in a dry pulverized form are greenish yellow to orange yellow, soluble in sulfuric acid giving red colored solutions and in boiling hot nitrobenzol giving orange yellow colored solutions and which dye cotton from blue hydrosulfite vats reddish to greenish yellow tints which are fast to alkali.

2. As new products, vat dyestuffs of the anthraquinone series which are fast to alkali, which are reaction products of formaldehyde on pyrazolanthron yellow, which dyestuffs in a dry pulverized form are greenish yellow to orange yellow, are soluble in sulfuric acid giving red colored solutions and in boiling hot nitrobenzol giving orange yellow colored solutions, and which dye cotton from blue hydrosulfite vats reddish to greenish yellow tints which are fast to alkali.

3. Process of preparing new vat dyestuffs of the anthraquinone series which are fast to alkali, consisting in allowing formaldehyde to act upon pyrazolanthron yellow compounds in sulfuric acid solution.

4. Process of preparing new vat dyestuffs of the anthraquinone series which are fast to alkali, consisting in allowing formaldehyde to act upon pyrazolanthron yellow in sulfuric acid solution.

In testimony whereof, I affix my signature.

ALFRED HOLL.